(12) United States Patent
Kim et al.

(10) Patent No.: US 9,794,973 B2
(45) Date of Patent: Oct. 17, 2017

(54) METHOD AND APPARATUS FOR PROVIDING PROXIMITY SERVICE (71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 14/777,171

(22) PCT Filed: Mar. 18, 2014

(86) PCT No.: PCT/KR2014/002273
§ 371 (c)(1),
(2) Date: Sep. 15, 2015

(87) PCT Pub. No.: WO2014/148795
PCT Pub. Date: Sep. 25, 2014

(65) Prior Publication Data
US 2016/0044488 A1 Feb. 11, 2016

Related U.S. Application Data (60) Provisional application No. 61/803,468, filed on Mar. 20, 2013, provisional application No. 61/814,354,
(Continued)

(51) Int. Cl.
H04W 76/02 (2009.01)
H04W 8/00 (2009.01)
(Continued)

(52) U.S. Cl.
CPC ......... *H04W 76/023* (2013.01); *H04W 8/005* (2013.01); *H04W 8/08* (2013.01); *H04W 76/046* (2013.01); *H04W 76/068* (2013.01)

(58) Field of Classification Search
CPC ............. H04W 76/023; H04W 76/043; H04W 76/046; H04W 4/005–4/008; H04W 8/005; H04W 76/068
See application file for complete search history.

(56) References Cited

U.S. PATENT DOCUMENTS

2009/0092091 A1   4/2009   Balasubramanian
2013/0044590 A1   2/2013   Lee et al.
(Continued)

FOREIGN PATENT DOCUMENTS

JP   2003-198926 A   7/2003
JP   2010-541502 A   12/2010
(Continued)

OTHER PUBLICATIONS

3rd Generation Partnership Project, "Technical Specification Group Services and System Aspects; Feasibility Study for Proximity Services (ProSe) (Release 12)," 3GPP TR 22.803, V12.1.0, Mar. 2013, pp. 1-45.
(Continued)

*Primary Examiner* — Marcus R Smith
(74) *Attorney, Agent, or Firm* — Birch, Stewart, Kolasch & Birch, LLP (57) ABSTRACT The present invention relates to a method and an apparatus for managing a user equipment (UE), by a base station (eNodeB), in a wireless communication system supporting a proximity service (ProSe). More particularly, the method comprises the steps of: determining the connection state of a UE; and starting a radio resource control (RRC) inactivity timer when the connection state of the UE is idle, wherein
(Continued)

the connection state is determined according to whether the UE performs infrastructure communication and whether the UE performs ProSe communication.

9 Claims, 4 Drawing Sheets

Related U.S. Application Data filed on Apr. 22, 2013, provisional application No. 61/873,841, filed on Sep. 5, 2013, provisional application No. 61/877,242, filed on Sep. 12, 2013.

(51) Int. Cl.
  *H04W 8/08* (2009.01)
  *H04W 76/06* (2009.01)
  *H04W 76/04* (2009.01)

(56) References Cited

U.S. PATENT DOCUMENTS

| | | | |
|---|---|---|---|
| 2014/0023008 A1 | 1/2014 | Ahn et al. | |
| 2014/0155114 A1* | 6/2014 | Wu | H04W 76/043 455/509 |
| 2014/0200015 A1 | 7/2014 | Kweon et al. | |
| 2014/0349694 A1* | 11/2014 | Raghothaman | H04W 36/00 455/509 |
| 2015/0223284 A1* | 8/2015 | Jain | H04W 52/0258 370/329 |
| 2015/0245394 A1* | 8/2015 | Sharma | H04W 48/16 455/434 |

FOREIGN PATENT DOCUMENTS

| | | |
|---|---|---|
| KR | 10-2010-0072341 A | 6/2010 |
| KR | 10-2011-0108261 A | 10/2011 |
| KR | 10-2012-0074254 A | 7/2012 |
| WO | WO 2008/040962 A1 | 4/2008 |
| WO | WO 2012/042041 A1 | 4/2012 |
| WO | WO 2013/015662 A2 | 1/2013 |

OTHER PUBLICATIONS

3rd Generation Partnership Project, "Technical Specification Group Services and System Aspects; General Packet Radio Service (GPRS) Enhancements for Evolved Universal Terrestrial Radio Access Network (E-UTRAN) Access (Release 12)," 3GPP TS 23.401, V12.0.0, Mar. 2013, pp. 1-290.

3rd Generation Partnership Project, "Technical Specification Group Services and System Aspects; Study on Architecture Enhancements to Support Proximity Services (ProSe) (Release 12)," 3GPP TR 23.703, V0.5.0, Jul. 2013, (EPO Server date Jul. 27, 2013, pp. 1-176, XP050712256.

Alcatel-Lucent et al., "Core Network Assisted eNB Parameters Tuning for Small Data Transfer," SA WG2 Temporary Document, SA WG2 Meeting #95, S2-130571, Prague, Czech Republic, Jan. 28-Feb. 1, 2013, pp. 1-5.

LG Electronics Inc., "RRC Connection State Management," 3GPP TSG-RAN WG2 #87, R2-143745, Dresden, Germany, Aug. 18-22, 2014 (EPO Server date Aug. 17, 2014), 1 page, XP050794693.

* cited by examiner

METHOD AND APPARATUS FOR PROVIDING PROXIMITY SERVICE

CROSS REFERENCE TO RELATED APPLICATIONS

This application is the National Phase of PCT International Application No. PCT/KR2014/002273, filed on Mar. 18, 2014, which claims priority under 35 U.S.C. 119(e) to U.S. Provisional Application No. 61/803,468, filed on Mar. 20, 2013, U.S. Provisional Application No. 61/814,354, filed on Apr. 22, 2013, U.S. Provisional Application No. 61/873,841, filed on Sep. 5, 2013, and U.S. Provisional Application No. 61/877,242, filed on Sep. 12, 2013, all of which are hereby expressly incorporated by reference into the present application.

TECHNICAL FIELD

The present invention relates to a wireless communication system and, more particularly, to a method and apparatus for providing a proximity service.

BACKGROUND ART

A Proximity Service (ProSe) refers to a scheme that supports communication between devices located physically close to each other. Specifically, ProSe is aimed to discover an application operating in devices that are in proximity to each other and ultimately to support an operation of exchanging application-related data. For example, it may be considered that ProSe is applied to applications such as Social Network Services (SNS), commerce, and games.

ProSe may also be called Device-to-Device (D2D) communication. That is, ProSe refers to a communication scheme for establishing a direct link between a plurality of devices (e.g., User Equipments (UEs)) and thus directly exchanging user data (e.g., voice or multimedia data) between the devices without passing through a network. ProSe communication may include UE-to-UE communication, peer-to-peer communication, etc. In addition, the ProSe communication scheme may be applied to Machine-to-Machine (M2M) communication, Machine Type Communication (MTC), etc. Therefore, ProSe is being considered as one solution to burden of an eNodeB due to data traffic that rapidly increases. By introducing ProSe, effects such as reduction in procedures of the eNodeB, decreases in power consumption of devices that participate in ProSe, increase in data transmission rate, increase in network accommodation capacity, load distribution, cell coverage expansion, etc. can be expected.

DISCLOSURE

Technical Problem

Although necessity of adopting ProSe has been discussed, a mechanism for supporting and controlling ProSe has not specifically been provided yet.

An object of the present invention is to provide a method for performing efficient communication in the case in which a UE performs only ProSe communication without performing infrastructure communication in relation to a ProSe based communication mechanism.

The technical objects that can be achieved through the present invention are not limited to what has been particularly described hereinabove and other technical objects not described herein will be more clearly understood by persons skilled in the art from the following detailed description.

Technical Solution

In an aspect of the present invention for achieving the objects off the present invention, provided herein is a method for managing a User Equipment (UE) by an eNodeB in a wireless communication system supporting a Proximity Service (ProSe), comprising determining a connected state of the UE; and if the connected state of the UE is an idle state, starting a Radio Resource Control (RRC) inactivity timer, wherein the connected state is determined according to whether the UE performs infrastructure communication and whether the UE performs ProSe communication.

The ProSe communication may be at least one of ProSe Evolved Universal Terrestrial Radio Access (E-UTRA) communication, ProSe group communication, ProSe broadcast communication, and ProSe-assisted Wireless Local Area Network (WLAN) direct communication.

The determining the connected state of the UE may comprise determining that the UE is in the idle state upon receiving a message indicating termination of the Prose communication from the UE in a state in which the UE does not perform the infrastructure communication.

The determining the connected state of the UE may comprise determining that the UE is in the idle state upon receiving a message indicating termination of the Prose communication from a Mobility Management Entity (MME) in a state in which the UE does not perform the infrastructure communication.

The determining the connected state of the UE may comprise determining that the UE is in the idle state when the eNodeB performs at least one of an operation of terminating the ProSe communication of the UE, an operation of stopping use of a radio resource allocated to the ProSe communication, and an operation of receiving information related to termination of the ProSe communication from another network node in a state in which the UE does not perform the infrastructure communication.

The method may further comprise performing an S1 release procedure when the RRC inactivity timer expires in a state in which the UE does not perform the infrastructure communication.

The method may further comprise one of an operation of releasing a radio resource related to the ProSe communication of the UE, an operation of indicating that the ProSe communication of the UE has been terminated to a Mobility Management Entity (MME), and an operation of releasing a ProSe related context of the eNodeB when the RRC inactivity timer expires in a state in which the UE does not perform the infrastructure communication.

The UE may be configured to release a resource related to the ProSe communication when the ProSe communication has been terminated in a state in which the UE does not perform the infrastructure communication. The resource related to the ProSe communication may be at least one of a bearer, an Internet Protocol (IP) connection, a Packet Data Network (PDN) connection, an IP address, and a Traffic Flow Template (TFT).

The UE may be configured to perform communication in a new mode and the new mode is defined as a mode in which the infrastructure communication is not performed but the ProSe communication is performed. The UE may be in a state in which an S1-U interface is not generated. The method may further comprise generating the S1-U interface for the UE upon recognizing user data to be transmitted through an infrastructure data path from the UE. The S1-U interface may be generated based on interaction with a Mobility Management Entity (MME) and/or information prestored in the eNodeB.

In another aspect of the present invention for achieving the objects of the present invention, provided herein is a network entity of a wireless communication system supporting a Proximity Service (ProSe), comprising a radio frequency unit; and a processor, wherein the processor is configured to determine a connected state of a User Equipment (UE) and start a Radio Resource Control (RRC) inactivity timer when the connected state of the UE is an idle state, and wherein the connected state is determined according to whether the UE performs infrastructure communication and whether the UE performs ProSe communication.

Advantageous Effects

According to the present invention, efficient communication can be performed in the case in which a UE performs only ProSe communication without performing infrastructure communication.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE

The embodiments described hereinbelow are combinations of elements and features of the present invention in a predetermined format. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the technical scope of the present invention.

In some instances, well-known structures and devices are omitted in order to avoid obscuring the concepts of the present invention or the important functions of the structures and devices are shown in block diagram form. The same reference numbers will be used throughout the drawings to refer to the same or like parts.

The embodiments of the present invention can be supported by standard documents disclosed for at least one of an Institute of Electrical and Electronics Engineers (IEEE) 802 series system, a 3rd Generation Partnership Project (3GPP) system, a 3GPP Long Term Evolution (3GPP LTE) system, a 3GPP LTE-Advanced (LTE-A) system, and a 3GPP2 system. For steps or parts which are not described to clarify the technical idea of the present invention, reference may be made to these documents. Further, all terms as set forth herein can be explained by the standard documents.

The following technologies can be used in various wireless communication systems. For clarity, a 3GPP LTE system and a 3GPP LTE-A system will be focused upon in the following description but the scope of the present invention is not limited thereto.

Terminology used in the present specification is defined as follows.

UMTS (Universal Mobile Telecommunications System): A third generation mobile communication technology based on Global System for Mobile communication (GSM), developed by 3GPP.

EPS (Evolved Packet System): A network system consisting of access networks such as an Evolved Packet Core (EPC), which is an Internet Protocol (IP)-based packet switched core network, LTE, and UMTS Terrestrial Radio Access Network (UTRAN). EPS is an evolved version of UMTS.

NodeB: A base station of a GSM/enhanced data rates for GSM Evolution (EDGE) Radio Access Network (GERAN)/UTRAN, which is installed outdoors and has coverage corresponding to a macro cell.

eNodeB (evolved Node B): A base station of an LTE network, which is installed outdoors and has a coverage corresponding to a macro cell.

UE (User Equipment): A user device. UE may be referred to as a terminal, a Mobile Equipment (ME), a Mobile Station (MS), etc. In addition, UE may be a portable device such as a notebook computer, a cellular phone, a Personal Digital Assistant (PDA), a smartphone, or a multimedia device or may be a non-portable device such as a Personal Computer (PC) or a vehicle mounted device. UE is capable of performing communication using a 3GPP spectrum such as LTE and/or a non-3GPP spectrum such as Wi-Fi or a public safety spectrum.

ProSe (Proximity Service or Proximity-based Service): A service that enables discovery between physically adjacent devices and enables direct communication/communication via a base station/communication via a third device. In this case, user plane data is exchanged through a direct data path or a direct mode data path without passing through a 3GPP core network (e.g., EPC). ProSe is also referred to as a D2D service.

Proximity: Whether a UE is in the proximity of another UE is determined based on whether predetermined proximity criteria are satisfied. Different proximity criteria can be given for ProSe discovery and ProSe communication. The proximity criteria may be configured to be controlled by an operator.

ProSe discovery: A process that identifies that a UE is in proximity to another, using Evolved Universal Terrestrial Radio Access (E-UTRA).

ProSe communication: Communication between UEs in proximity by means of a communication path established between the UEs. The communication path may be established directly between the UEs or routed via local base station(s) (e.g., eNodeB(s)).

ProSe-enabled UE: A UE supporting ProSe discovery and/or ProSe communication. Hereinafter, this UE is referred to as a UE.

ProSe-enabled network: A network supporting ProSe discovery and/or ProSe communication. Hereinafter, this network is referred to as a network.

ProSe E-UTRA communication: ProSe communication using a ProSe E-UTRA communication path.

ProSe-assisted WLAN direct communication: ProSe communication using a Prose-assisted WLAN direct communication path. ProSe-assisted WLAN direct communication may be referred to as EPC-assisted WLAN direct communication.

ProSe group communication: One-to-many ProSe communication between two more ProSe-enabled UEs in proximity, as a common communication path establishment method between ProSe-enabled UEs.

ProSe broadcast communication: One-to-all ProSe communication between two or more ProSe-enabled UEs in proximity, as a common communication path establishment method between ProSe-enabled UEs.

ProSe UE-to-network relay: A relay type in which a ProSe-enabled public safety UE acts as a communication relay between a ProSe-enabled public safety UE and a ProSe-enabled network using E-UTRA.

ProSe UE-to-UE relay: A relay type in which a ProSe-enabled public safety UE acts as a ProSe communication relay between ProSe-enabled public safety UEs.

RAN (Radio Access Network): A unit including a NodeB, an eNodeB, and a Radio Network Controller (RNC) for controlling the NodeB and the eNodeB in a 3GPP network. RAN is present between a UE and a core network and provides connection to the core network.

HLR (Home Location Register)/HSS (Home Subscriber Server): A database having subscriber information in a 3GPP network. HSS may perform functions such as configuration storage, identity management, and user state storage.

RANAP (RAN Application Part): An interface between RAN and a node (e.g., Mobility Management Entity (MME)/serving GPRS (General Packet Radio Service) Supporting Node (SGSN)/Mobile Switching Center (MSC)) for controlling a core network.

PLMN (Public Land Mobile Network): A network configured to provide a mobile communication service to individuals. PLMN may be configured on an operator basis.

NAS (Non-Access Stratum): A functional layer for exchanging signaling and traffic messages between a UE and a core network in a UMTS protocol stack. NAS supports mobility of a UE and supports a session management procedure for establishing and maintaining IP connection between the UE and a Packet Data Network Gateway (PDN GW).

Home NodeB (HNB): A Customer Premises Equipment (CPE) that provides coverage of a UTRAN. For details of the HNB, reference may be made to the standard document TS 25. 467.

Home eNodeB (HeNB): A CPE that provides coverage of an evolved-UTRAN (E-UTRAN. For details of the HeNB, refer to standard document TS 36. 300.

CSG (Closed Subscriber Group): A group of subscribers who are permitted to access one or more CSG cells of a PLMN as members of a CSG of an H(e)NB.

LIPA (Local IP Access): Access of an IP-capable UE to another IP-capable entity in the same residential/enterprise IP network via an H(e)NB. LIPA traffic does not traverse a mobile operator's network. A 3GPP Release-10 system provides access via an H(e)NB to resources of a local network (e.g., network located at the customer's home or enterprise).

SIPTO (Selected IP Traffic Offload): In a 3GPP Release-10 system, an operator selects a packet data network gateway (PGW) which is physically close to a UE in an EPC network and thus supports handover of user traffic.

PDN (Packet Data Network) connection: Logical connection between a UE indicated by a single IP address (e.g., a single IPv4 address and/or a single IPv6 prefix) and a PDN indicated by an Access Point Name (APN).

EPC (Evolved Packet Core)

Figure 1:
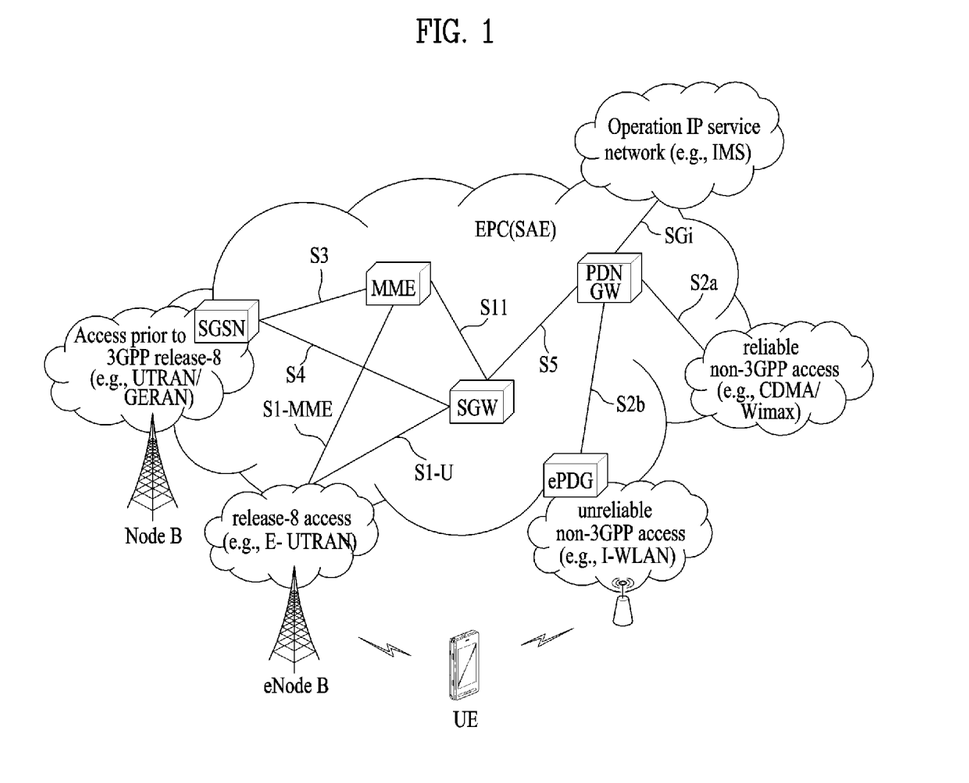
FIG. 1 is a view schematically illustrating the architecture of an Evolved Packet System (EPS) including an Evolved Packet Core (EPC).

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2 G/3 G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control Mechanism for Providing Proximity Service (ProSe)

The present invention proposes a control mechanism for supporting ProSe or a D2D service in a mobile communication system such as a 3GPP EPS.

Due to increase in user demands related to SNS, etc., demand for detection/discovery and special applications/services (e.g., proximity-based applications/services), between physically adjacent users/devices, has arisen. To provide such services even in a 3GPP mobile communication system, potential use cases and scenarios of the ProSe and potential service requirements are under discussion.

The potential use cases of the ProSe may include a commercial/social service, network offloading, public safety, and integration of current infrastructure services (to assure the consistency of user experience including reachability and mobility aspects). In addition, use cases and potential requirements for public safety in the case of absence of E-UTRAN coverage (in this case, limiting the use cases to specific frequency bands and specific terminals that are designated for public safety under the condition that specific regional regulation and operator policy are satisfied, should be considered) are under discussion.

In particular, the scope of discussion of the ProSe that is underway in 3GPP assumes that the proximity-based applications/services are provided via LTE or a WLAN and that discovery and communication are performed between devices under the control of an operator/network.

Figure 2:
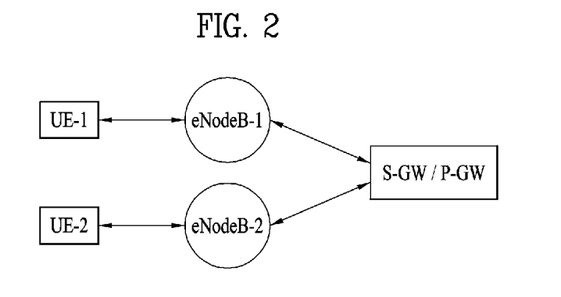
FIG. 2 is a view illustrating a default data path for communication between two UEs in an EPS.

FIG. 2 is a view illustrating a default data path for communication between two UEs in an EPS. That is, FIG. 2 illustrates an exemplary data path between UE-1 and UE-2 in a general case in which ProSe between UE-1 and UE-2 is not applied. This default path passes through a base station (e.g., an eNodeB or HeNodeB) and gateway nodes (e.g., an EPC or operator network). For example, as illustrated in FIG. 2, when UE-1 and UE-2 exchange data, data from UE-1 may be transmitted to UE-2 via eNodeB-1, an S-GW/P-GW, and eNodeB-2 and, likewise, data from UE-2 may be transmitted to UE-1 via eNodeB-2, an S-GW/P-GW, and

TABLE 1

| Reference Point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. | eNodeB-1. Although UE-1 and UE-2 are camping on different eNodeBs in FIG. 2, UE-1 and UE-2 may camp on the same eNodeB. In addition, although the two UEs are served by the same S-GW and P-GW in FIG. 2, various combinations of services are allowed. For example, the UEs may be served by the same S-GW and different P-GWs, by different S-GWs and the same P-GW, or by different S-GWs and different P-GWs.

In the present invention, this default data path may be referred to as an infrastructure path, infrastructure data path, or infrastructure communication path. In addition, communication through the infrastructure data path may be referred to as infrastructure communication.

Figure 3:
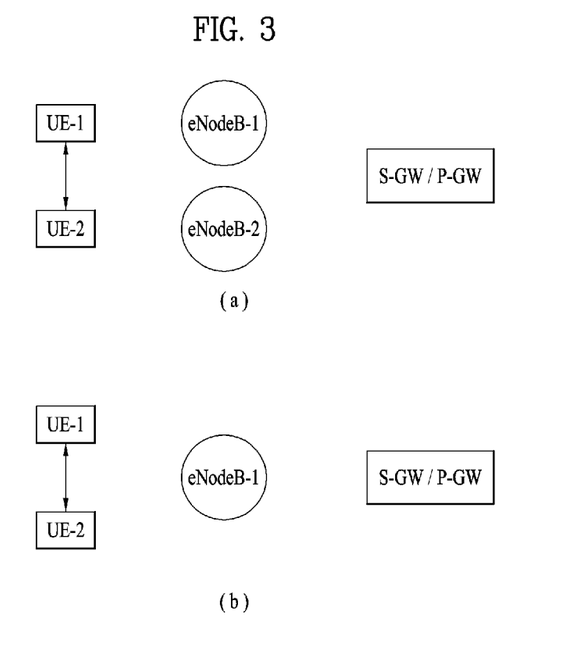
FIG. 3 is a view illustrating a direct mode data path between two UEs based on ProSe.

FIG. 3 is a view illustrating a direct mode data path between two UEs based on ProSe. This direct mode communication path does not pass via a base station (e.g., an eNodeB or HeNodeB) and gateway nodes (e.g., an EPC).

FIG. 3(a) illustrates an exemplary case in which UE-1 and UE-2 are camping on different eNodeBs (e.g., eNodeB-1 and eNodeB-2) and exchange data via a direct mode communication path. FIG. 3(b) illustrates an exemplary case in which UE-1 and UE-2 are camping on the same eNodeB (e.g., eNodeB-1) and exchange data via a direct mode communication path.

Meanwhile, it should be noted that a data path of a user plane is directly established between UEs without passing through an eNodeB or a gateway node as illustrated in FIG. 3 but a control plane path may be established via an eNodeB and a core network. Control information exchanged through the control plane path may be information about session management, authentication, authorization, security, billing, etc. In the case of ProSe communication between UEs served by different eNodeBs as illustrated in FIG. 3(a), control information for UE-1 may be exchanged via eNodeB-1 with a control node (e.g., an MME) of a core network and control information for UE-2 may be exchanged via eNodeB-2 with a control node (e.g., an MME) of a core network. In the case of ProSe communication between UEs served by the same eNodeB as illustrated in FIG. 3(b), control information for UE-1 and UE-2 may be exchanged via eNodeB-1 with a control node (e.g., an MME) of a core network.

Figure 4:
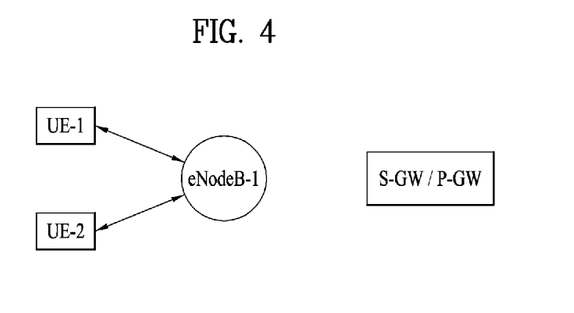
FIG. 4 is a view illustrating a locally routed data path between two UEs based on ProSe.

FIG. 4 is a view illustrating a locally routed data path between two UEs based on ProSe. As illustrated in FIG. 4, a ProSe communication data path between UE-1 and UE-2 is established via eNodeB-1 but does not pass through a gateway node (e.g., an EPC) operated by an operator. For a control plane path, if a locally routed data path is established between UEs served by the same eNodeB as illustrated in FIG. 4, control information for UE-1 and UE-2 may be exchanged via eNodeB-1 with a control node (e.g., an MME) of a core network.

In the present invention, the communication path described above in relation to FIGS. 3 and 4 may be referred to as a direct data path, a data path for ProSe, a ProSe-based data path, or a ProSe communication path. In addition, communication through this direct data path may be referred to as direct communication, ProSe communication, or ProSe-based communication.

Figure 5:
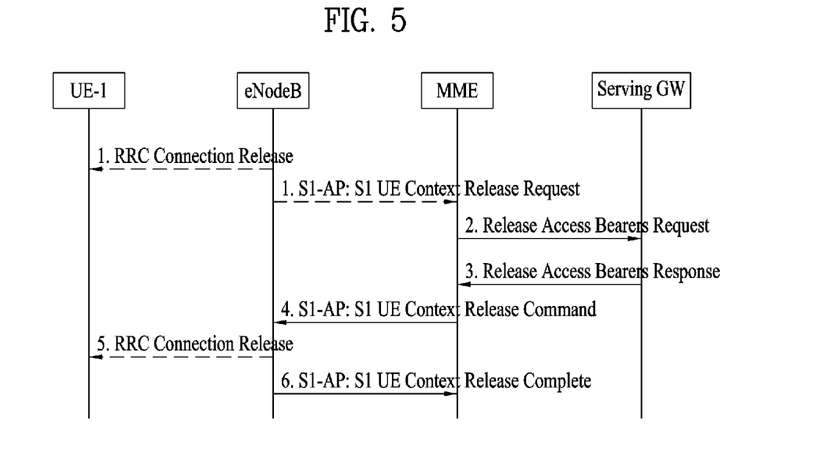
FIG. 5 is a view referred to for describing an S1 release procedure.

FIG. 5 is a view referred to for describing an S1 release procedure.

An eNodeB performs an operation of transitioning a UE to an idle state using an RRC inactivity timer/RRC release timer/RRC user inactivity timer, unless user traffic for the UE in a connected state is detected (in other words, if data inactivity is detected) during the timer. To this end, the eNodeB performs an S1 release procedure as illustrated in FIG. 5. For details of the S1 release procedure, refer to the S1 release procedure of section 5.3.5 of 3GPP TS 23.401.

That is, in step 1 of FIG. 5, the eNodeB transmits a UE Context Release Request message to an MME. The UE Context Release Request message includes information as shown in Table 2.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| Cause | M | | 9.2.1.3 | | YES | ignore |
| GW Context Release Indication | O | | 9.2.1.84 | | YES | reject |

The UE Context Release Request message is transmitted from the eNodeB via an S1 interface in order to release UE-associated S1-logical connection. If information "User Inactivity" is configured as the "Cause" of the UE Context Release Request message, the eNodeB indicates to the MME that the UE context release request is caused by data inactivity of the UE/user.

If the UE performs only ProSe communication (more specifically, ProSe communication using a ProSe communication path rather than a locally routed data path), the eNodeB starts the RRC inactivity timer on the premise that there is no data traffic as described above in relation to FIGS. 2 to 4 and, if the timer has expired, the eNodeB performs an operation for causing the UE to transition to an idle state, that is, the S1 release procedure. Then, a problem of transiting to an idle state arises even if the UE performs communication. In this case, a situation in which the UE performs only ProSe communication may be a situation in which infrastructure communication and ProSe communication are performed simultaneously (i.e. in parallel) and, thereafter, infrastructure communication is ended or a situation in which only ProSe communication is performed without initiating infrastructure communication.

1. Operation of eNodeB for ProSe

The present invention proposes a mechanism for efficiently providing ProSe in a mobile communication system such as a 3GPP EPS. The ProSe provision mechanism proposed in the present invention includes a combination of one or more operations among 1-1) RRC inactivity timer management of eNodeB, 1-2) Start of RRC inactivity timer of eNodeB as in prior art, and 1-3) Management of newly defined ProSe communication related RRC inactivity timer in addition to conventional RRC inactivity timer of eNodeB, which will be described hereinbelow. Hereinafter, the operations of 1-1) to 1-3) proposed in the present invention will be described in detail.

1-1. RRC Inactivity Timer Management of eNodeB

Hereinafter, an inactivity timer of an eNodeB may be referred to as an RRC release timer, an RRC user inactivity timer, or an RRC inactivity release timer.

When a UE in a connected state does not perform infrastructure communication or the eNodeB detects that the UE does not perform infrastructure communication any more, the eNodeB does not start the RRC inactivity timer for the UE if one or more of the following conditions is satisfied.

i) Case in which the UE performs ProSe E-UTRA communication (this case may include both communication via a direct path between UEs and communication via a locally routed data path passing through the eNodeB or include only communication via a direct path between UEs.)

ii) Case in which the UE performs ProSe group communication iii) Case in which the UE performs ProSe broadcast communication iv) Case in which the UE performs ProSe-assisted WLAN direct communication As described above, if the eNodeB does not start the RRC inactivity timer for the UE because the UE is performing ProSe communication, the eNodeB starts the RRC inactivity timer when all ProSe communication is terminated (i.e. in the case in which it is detected/determined that ProSe communication is not performed).

The eNodeB may detect/determine that ProSe communication has been terminated using one or more of the following methods. The following methods a) to c) may be applied, throughout the present invention, to a situation in which the eNodeB detects/determines that ProSe communication has been terminated.

a) If the UE transmits a message indicating that ProSe communication has been terminated (e.g. a NAS message, an AS message, and/or an IMS SIP message) to a network, the eNodeB may detect/determine that ProSe communication has been terminated.

That is, the UE may transmit the message indicating that ProSe communication has been terminated to the network whenever individual ProSe communication is ended, transmit the message to the network when all ProSe communication is ended, or transmit the message to the network when ProSe communication, which has the same properties or is capable of performing grouping, is terminated (i.e. when last ProSe communication among ProSe communication forms of the same properties is terminated).

The message (transmitted by the UE) may explicitly or implicitly include various information related to terminated ProSe communication (e.g. information about a communication counterpart, bearer related information, and PDN related information). ProSe communication, which has the same properties or is capable of performing grouping, may include, for example, ProSe communication having the same communication counterpart and ProSe communication having the same QoS. The network may be, for example, at least one of a RAN node (e.g. eNodeB), a core network node (e.g., MME, S-GW, P-GW, PCRF, HSS, ANDSF, node/server/function/entity for ProSe), and an IMS node (e.g., P-CSCF, S-CSCF, or application server). The above description may be applied throughout the present invention.

b) If an MME transmits a message indicating that ProSe communication has been terminated to the eNodeB, the eNodeB may detect/determine that ProSe communication has been terminated.

That is, the MME may transmit the message indicating that ProSe communication has been terminated to the eNodeB whenever individual ProSe communication is ended, transmit the message to the eNodeB when all ProSe communication for one UE/user is terminated, or transmit the message to the eNodeB when ProSe communication, which has the same properties for one UE/user or is capable of performing grouping, is terminated (i.e. when last ProSe communication among ProSe communication forms of the same properties is terminated).

The message (transmitted by the MME) may explicitly or implicitly include various information related to ended ProSe communication (e.g. information about the UE, bearer related information, and PDN related information).

c) The eNodeB may directly detect/determine that ProSe communication has been terminated.

That is, the method of c) means that the eNodeB detects/determines that ProSe communication has been ended, using methods other than the above-described methods of a) and b). For example, the eNodeB may detect/determine that ProSe communication has been terminated by causing the UE to terminate ProSe communication, by recognizing that radio resources that have been used for ProSe communication are not used any more, or by acquiring information related to termination of ProSe communication from other network nodes.

The above-described message (transmitted in a situation in which the eNodeB detects/determines that ProSe communication has been terminated) may be a conventional message or may be a newly defined message (for the present invention). If the conventional message is used, a new Information Element (IE) may be defined or a new value using a conventional IE may be defined.

That is, the eNodeB does not start the RRC inactivity timer if the UE in a connected state performs one or more of infrastructure communication and ProSe communication (i.e., one or more of i to iv corresponding to the case in which the RRC inactivity timer is not started). The eNodeB may start the RRC inactivity timer if the UE in a connected state performs neither infrastructure communication nor ProSe communication (i.e., one or more of i to iv corresponding to the case in which the RRC inactivity timer is not started) or if it is detected/determined that the UE in a connected state performs neither infrastructure communication nor ProSe communication. If the inactivity timer has expired, the eNodeB performs the S1 release procedure.

1-2. Start of RRC Inactivity Timer (i.e. Infrastructure Communication Related RRC Inactivity Timer) of eNodeB as in Prior Art The eNodeB starts the inactivity timer as in the prior art if it is detected/determined that the UE does not perform infrastructure communication any more and performs the S1 release procedure if the inactivity timer has elapsed.

If the UE is performing ProSe communication when the eNodeB performs the S1 release procedure, the eNodeB may perform RRC connection releases of step 1 or step 5 of FIG. 5 while not affecting radio resources related to ProSe communication or may not perform RRC connection release for the UE.

In addition, if the UE is performing ProSe communication when the eNodeB performs the S1 release procedure, the eNodeB may include information indicating that the UE is still performing ProSe communication or information indicating only infrastructure communication has been terminated in a UE Context Release Request message upon transmitting the UE context Release Request message to the MME in step 1 of FIG. 5 or may transmit a message of a new type including the above information (i.e. a message defined for the present invention) to the MME.

In addition, if the UE is performing ProSe communication in spite of expiry of the RRC inactivity timer, the eNodeB may remain in a connected state instead of transitioning to an idle state or transition to a new type of state.

1-3. Management of ProSe Communication Related RRC Inactivity Timer Newly Defined for the Present Invention (Hereinafter, ProSe RRC Inactivity Timer) in Addition to Conventional RRC Inactivity Timer (i.e. an Infrastructure Communication Related RRC Inactivity Timer) of eNodeB If it is detected/determined that the UE does not perform ProSe communication any more, the eNodeB starts the ProSe RRC inactivity timer and, if the ProSe RRC inactivity timer has expired, the eNodeB performs one or more of the following operations:

an operation of releasing radio resources related to ProSe communication with respect to the UE, an operation of informing the MME that ProSe communication for the UE has been terminated, ProSe communication has become inactive, and/or ProSe communication is not active any more, and an operation of releasing/deleting a ProSe communication related context of the eNodeB for the UE.

Figure 6:
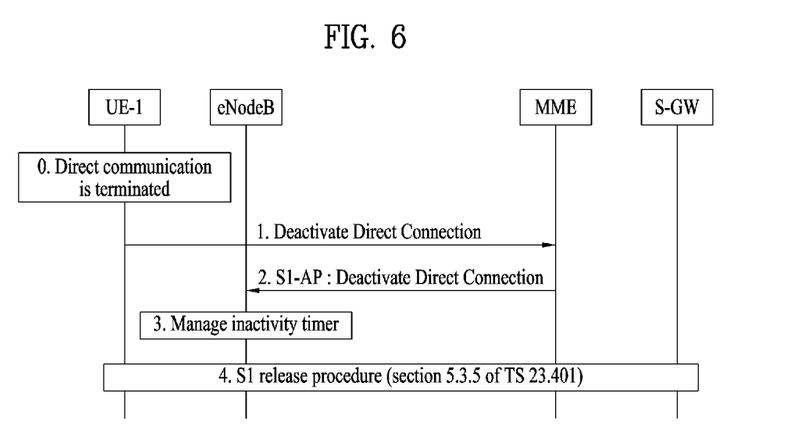
FIGS. 6 and 7 are view referred to for describing an S1 release procedure according to an embodiment of the present invention.

FIG. 6 is a view illustrating RRC inactivity timer management according to an embodiment of the present invention.

In step 0 of FIG. 6, direct communication between a UE to which the present invention is applied (hereinafter, UE-1) and another UE is terminated.

In step 1 of FIG. 6, UE-1 transmits, to an MME, a message indicating that direct communication has been terminated, a message indicating that direct connection has been deactivated, or a message for requesting termination/deactivation of direct communication. The message may include identification information about a counterpart UE/user/application that has performed direct communication. For a detailed description of this message, refer to description of operation 1-1 (i.e. RRC inactivity timer management of the eNodeB). Although not illustrated in FIG. 6, the MME may transmit a response message to UE-1. For reference, UE-1 may transmit the message to the MME when UE-1 is within network coverage or is served by an E-UTRAN.

In step 2 of FIG. 6, the MME transmits, to the eNodeB, a message indicating that direct communication has been terminated, a message indicating that direct connection has been deactivated, or a message for requesting termination/deactivation of direct communication. The message may include bearer information related to the terminated direct communication (e.g. association between EPS bearer(s) and corresponding direct bearer(s)). For detailed description of this message, refer to description of operation 1-1 (i.e. RRC inactivity timer management of eNodeB). Although not illustrated in FIG. 6, the eNodeB may transmit a response message to the MME.

In step 3 of FIG. 6, the eNodeB starts an RRC inactivity timer if UE-1 performs any neither infrastructure communication nor ProSe communication (i.e. one or more of i to iv corresponding to the above-described case in which the eNodeB does not start the RRC inactivity timer in operation 1-1) or if it is detected/determined that UE-1 performs neither infrastructure communication nor ProSe communication.

In step 4 of FIG. 6, if the RRC inactivity timer has expired, the eNodeB performs an S1 release procedure. Then, UE-1 may transition/switch from an EPS Connection Management (ECM)-CONNECTED state (or connected state/mode or RRC_CONNECTED state) to an ECM-IDLE state (or idle state/mode or RRC_IDLE state). Additionally, according to a state proposed in section 6.2.3.5 "Direct Connection Management States" and section 6.2.4.5 "Direct Connection Management States" of 3GPP TR 23.703 v0.5.0, the UE (i.e., UE-1) may transition/switch from Direct Connection Management (DCM)-CONNECTED state to DCM-IDLE state.

Further, UE-1 may perform an operation of releasing/deactivating/deleting/updating resources and/or contexts that have been used prior to or after step 1 of FIG. 6. The resources used for ProSe communication may include one or more of bearer/IP connection/PDN connection/IP address/Traffic Flow Template (TFT).

Figure 7:
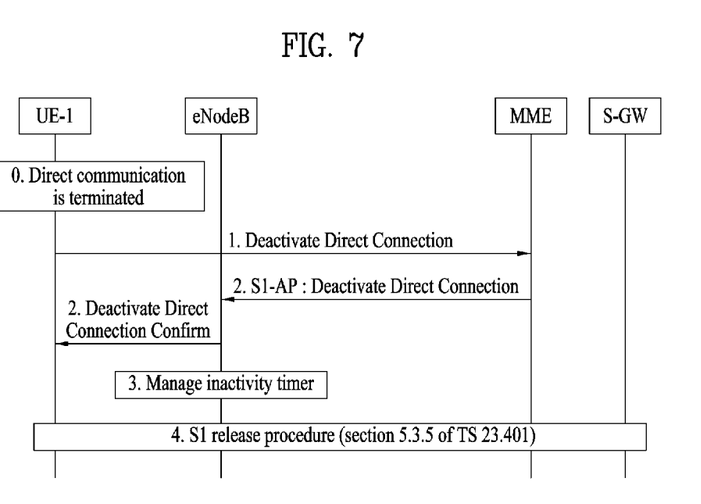

FIG. 7 is a view illustrating RRC inactivity timer management according to another embodiment of the present invention.

In step 0 of FIG. 7, direct communication between a UE to which the present invention is applied (hereinafter, UE-1) and another UE is terminated.

In step 1 of FIG. 7, UE-1 transmits, to an MME, a message indicating that direct communication has been terminated, a message indicating that direct connection has been deactivated, or a message for requesting termination/deactivation of direct communication. The message may include identification information about a counterpart UE/user/application that has performed direct communication. For a detailed description of this message, refer to description of operation 1-1 (i.e. RRC inactivity timer management of the eNodeB). For reference, UE-1 may transmit the message to the MME when UE-1 is within network coverage or is served by an E-UTRAN.

In step 2 of FIG. 7, the MME transmits a response message to deactivation of direct connection, i.e. a Deactivate Direct Connection Confirm message, to UE-1. The message is transmitted by being encapsulated in an S1-AP message (i.e. a Deactivate Direct Connection message) which is a message indicating that direct communication of UE-1 has been terminated, a message indicating that direct connection has been deactivated, or a message for requesting termination/deactivation of direct communication. The S1-AP message may include bearer information related to the terminated direct communication (e.g. association between EPS bearer(s) and corresponding direct bearer(s)). For detailed description of this message, refer to description of operation 1-1 (i.e. RRC inactivity timer management of eNodeB). In addition, the eNodeB transmits, to UE-1, the Deactivate Direct Connection Confirm message transmitted by the MME to UE-1.

In step 3 of FIG. 7, the eNodeB starts an RRC inactivity timer if UE-1 performs neither infrastructure communication nor ProSe communication (i.e. one or more of i) to iv) corresponding to the above-described case in which the eNodeB does not start the RRC inactivity timer in operation 1-1) or if it is detected/determined that UE-1 performs neither infrastructure communication nor ProSe communication.

In step 4 of FIG. 7, if the RRC inactivity timer has expired, the eNodeB performs an S1 release procedure. Then, UE-1 may transition/switch from an ECM-CONNECTED state (or connected state/mode or RRC_CONNECTED state) to an ECM-IDLE state (or idle state/mode or RRC_IDLE state). Additionally, according to a state proposed in section 6.2.3.5 "Direct Connection Management States" and section 6.2.4.5 "Direct Connection Management States" of 3GPP TR 23.703 v0.5.0, the UE (i.e., UE-1) may transition/switch from DCM-CONNECTED state to DCM-IDLE state.

Further, UE-1 may perform an operation of releasing/deactivating/deleting/updating resources and/or contexts that have been used prior to or after step 1 of FIG. 7. The resources used for ProSe communication may include one or more of bearer/IP connection/PDN connection/IP address/TFT.

Hereinafter, ProSe in the case in which an S1-U interface is not generated will be described.

2. ProSe Mode for UE Performing Only ProSe Communication

As described with reference to FIGS. 2 to 4, an S1-U interface is not needed for ProSe communication and thus the S1-U interface may not be generated. Then, the UE transitions from an idle mode to a connected mode by initiating ProSe communication. If the UE needs to transmit data through an infrastructure data path instead of performing ProSe communication (i.e. the UE needs to transmit data instead of performing circuit switched fallback (CSFB)), the UE does not perform a service request procedure with respect to a network in a current connected mode (for details of the service request procedure, reference is made to "UE triggered Service Request" of section 5.3.4.1 of 3GPP TS 23.401 and "Service request procedure" of section 5.6.1 of TS 24.301).

Accordingly, if the UE should transmit data through the infrastructure data path rather than ProSe communication, the UE transmits the data to the eNodeB through the infrastructure data path without performing the service request procedure. However, the eNodeB cannot perform data transmission because an S1-U, which is an interface for a user plane with an S-GW (i.e. with an EPC) is not present.

Therefore, the present invention proposes a method for solving a problem of incapability of transmitting data because the eNodeB does not include the S1-U interface in the case in which the UE needs to transmit data through the infrastructure data path rather than ProSe communication. That is, the present invention proposes a mechanism for efficiently providing ProSe in a mobile communication system such as a 3GPP EPS. The mechanism proposed in the present invention may include a combination of one or more operations of "2-1. Operation of transitioning to new node", "2-2. Operation related to service request procedure of UE", and "2-3. Operation of user data transmission of eNodeB" which will be described hereinbelow. Hereinafter, operations 2-1 to 2-3 proposed in the present invention will be described in detail.

2-1. Operation of Transitioning to New Mode

In the present invention, if a UE in an idle mode performs only ProSe communication (without performing infrastructure communication) by initiating ProSe communication, the UE transitions to a mode of a new value/type instead of transitioning to a conventional connected mode.

In this case, the new mode may be a mode defined for the present invention (e.g., a semi-connected mode or a ProSe-connected mode) or may be a mode other than a conventional idle mode and a conventional connected mode. Transition to the new mode may be applied only to the UE or may be applied to all of the UE and a network (an eNodeB, an MME, and/or a server for ProSe). The new mode is aimed to cause the UE and/or the network to be aware that the UE is performing only ProSe communication although the UE is performing communication or that an infrastructure communication path is not present or has not been activated even if the infrastructure communication path is present. For example, the new mode may be applied when the UE performs only ProSe communication within network coverage and does not perform infrastructure communication. It is apparent that the present invention may be applied even when the UE performs ProSe communication in a region other than network coverage.

2-2. Operation Related to Service Request Procedure of UE

1) If there is user data to be transmitted by the UE through an infrastructure data path (or user data pending transmission) and the UE is in the mode of a new value/type mentioned in 2-1 (i.e. operation of transitioning to the new mode), the UE performs a service request procedure.

2) If there is user data to be transmitted by the UE through the infrastructure data path (or user data pending transmission), the UE is in a connected mode, and the UE i) performs only ProSe communication or ii) has only a ProSe communication path, then the UE performs the service request procedure.

3) If there is user data to be transmitted by the UE through the infrastructure data path (or user data pending transmission), the UE is in an idle mode state, and the UE i) performs only ProSe communication or ii) has only a ProSe communication path, then the UE performs the service request procedure.

2-3. Operation of User Data Transmission of eNodeB

If the eNodeB has no S1-U interface for a specific UE but receives, from the specific UE, user data for which infrastructure communication should be performed, the eNodeB generates the S1-U interface and then transmits the user data to an S-GW. To generate the S1-U interface, the eNodeB may i) perform an interaction with an MME and/or ii) use information stored therein. The information stored in the eNodeB is information acquired from another network node and/or UE prior to generation of the S1-U interface.

While the above-described embodiments of the present invention have been described focusing upon the case in which the S1-U interface/S1-U resource is not generated when a UE in an idle mode initiates ProSe communication, the present invention may be applied to a scenario in which RRC connection or a radio resource is not generated for data transmission between the UE and the eNodeB and a scenario in which both the S1-U interface and RRC connection/radio resource are not generated.

In the above-described embodiments of the present invention, performance of the service request procedure by the UE includes an operation in which the UE transmits, to the network (e.g. an MME or eNodeB), i) a service request message, ii) an extended service request message, or iii) a message for requesting generation of the S1-U interface and/or RRC connection/radio resource. The message for requesting generation of the S1-U interface and/or RRC connection/radio resource may be one of a conventional NAS message, a conventional RRC message, and a newly defined message.

In the present invention, the idle mode may be one or more of the following modes.
EMM (EPS Mobility Management)-IDLE mode
ECM (EPS Connection Management)-IDLE mode
RRC (Radio Resource Control)_IDLE mode In the present invention, the connected mode may be one or more of the following modes.
EMM (EPS Mobility Management)-CONNECTED mode
ECM (EPS Connection Management)-CONNECTED mode
RRC (Radio Resource Control)_ CONNECTED mode The present invention described hereinabove is not limited to an LTE/EPC network and may be applied to a UMTS/EPS mobile communication system including both a 3GPP access network (e.g., UTRAN/GERAN/E-UTRAN)

and a non-3GPP connection network (e.g., WLAN). The present invention may also be applied to all wireless communication systems in an environment in which the other networks are controlled.

Figure 8:
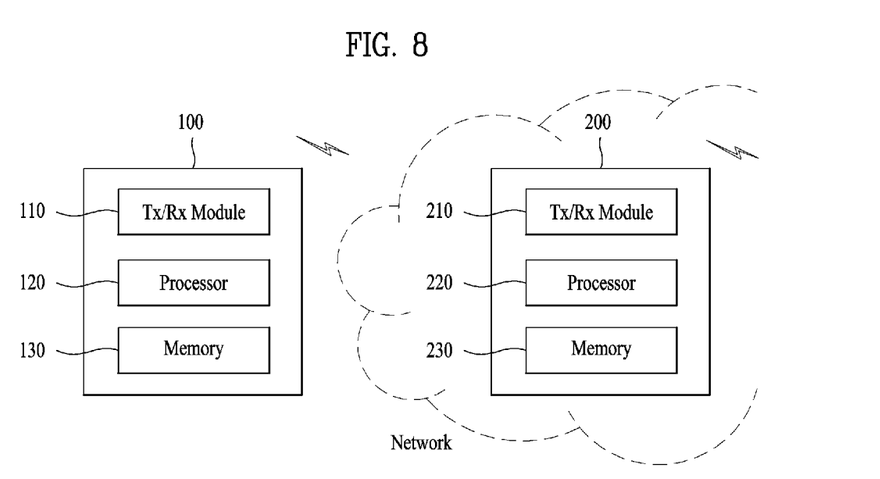
FIG. 8 is a view illustrating the configuration of a UE and a network node according to an exemplary embodiment of the present invention.

FIG. 8 is a view illustrating the configuration of a UE and a network node according to an exemplary embodiment of the present invention.

Referring to FIG. 8, a UE 100 according to the present invention may include a transmission (Tx)/reception (Rx) module 110, a processor 120, and a memory 130. The Tx/Rx module 110 may be configured to transmit various signals, data, and information to an external device and receive various signals, data, and information from the external device. The UE 100 may be connected to the external device by wire or wirelessly. The processor 120 may control overall operation of the UE 100 and may be configured to perform an arithmetic processing function for information to be transmitted/received by the UE to/from the external device. The memory 130 may store the arithmetically processed information for a predetermined time period and may be replaced with a component such as a buffer (not shown).

The UE 100 according to an embodiment of the present invention may be configured to participate in ProSe according to whether ProSe initiated by a network can be provided or according to a result of search of a ProSe UE. The processor 120 of the UE 100 may be configured to transmit basic ProSe information to the network node 200 using the Tx/Rx module 110. The processor 120 may be configured to receive information indicating whether ProSe is permitted from the network node 200 using the Tx/Rx module 110. The processor 120 may be configured to process signaling for performing direct data path setup with another UE. The processor 120 may be configured to perform direct communication with another UE using the Tx/Rx module 110. The processor 120 may be configured to transmit information related to a ProSe performance result to the network node 200 using the Tx/Rx module 110.

Referring to FIG. 8, a network node 200 according to the present invention may include a Tx/Rx module 210, a processor 220, and a memory 230. The Tx/Rx module 210 may be configured to transmit various signals, data, and information to an external device and receive various signals, data, and information from the external device. The network node 200 may be connected to the external device by wire or wirelessly. The processor 220 may control overall operation of the network node 200 and may be configured to perform an arithmetic processing function for information to be transmitted/received by the UE to/from the external device. The memory 230 may store the arithmetically processed information for a predetermined time period and may be replaced with a component such as a buffer (not shown).

The network node 200 according to an embodiment of the present invention may be configured to support ProSe between a plurality of UEs. The processor 220 of the network node 200 may be configured to receive basic ProSe information from the UE 100 or another network node using the Tx/Rx module 210. The processor 120 may be configured to transmit information indicating whether ProSe is permitted to the UE 100 using the Tx/Rx module 210. The processor 220 may be configured to process signaling so that the UE 100 may establish direct data path setup with another UE. The processor 220 may be configured to receive information related to a result of performing ProSe from the UE 100 using the Tx/Rx module 210.

The specific configurations of the UE 100 and the network node 200 may be implemented such that the various embodiments of the present invention are performed independently or two or more embodiments of the present invention are performed simultaneously. A repeated description will be omitted herein for clarity.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to limit the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems

The invention claimed is:

1. A method for managing a User Equipment (UE) by an eNodeB in a wireless communication system supporting a Proximity Service (ProSe), the method comprising:
   determining a connected state of the UE according to whether the UE performs infrastructure communication and whether the UE performs ProSe communication;
   determining whether or not to start a Radio Resource Control (RRC) inactivity timer based on the connected state of the UE, wherein if at least one of the infrastructure communication and the ProSe communication is performed, the RRC inactivity timer is determined not to start, and wherein if both of the infrastructure communication and the ProSe communication are not performed, the RRC inactivity timer is determined to start; and performing an S1 release procedure when the RRC inactivity timer expires, if both of the infrastructure communication and the ProSe communication are not performed.

2. The method according to claim 1,
wherein the ProSe communication is at least one of ProSe Evolved Universal Terrestrial Radio Access (E-UTRA) communication, ProSe group communication, ProSe broadcast communication, and ProSe-assisted Wireless Local Area Network (WLAN) direct communication.

3. The method according to claim 1,
wherein the determining the connected state of the UE comprises:
determining that the UE is in an idle state upon receiving a message indicating termination of the ProSe communication from the UE in a state in which the UE does not perform the infrastructure communication.

4. The method according to claim 1,
wherein the determining the connected state of the UE comprises:
determining that the UE is in an idle state upon receiving a message indicating termination of the ProSe communication from a Mobility Management Entity (MME) in a state in which the UE does not perform the infrastructure communication.

5. The method according to claim 1,
wherein the determining the connected state of the UE comprises:
determining that the UE is in an idle state when the eNodeB performs at least one of an operation of terminating the ProSe communication of the UE, an operation of stopping use of a radio resource allocated to the ProSe communication, and an operation of receiving information related to termination of the ProSe communication from another network node in a state in which the UE does not perform the infrastructure communication.

6. The method according to claim 1,
further comprising one of an operation of releasing a radio resource related to the ProSe communication of the UE, an operation of indicating that the ProSe communication of the UE has been terminated to a Mobility Management Entity (MME), and an operation of releasing a ProSe related context of the eNodeB when the RRC inactivity timer expires in a state in which the UE does not perform the infrastructure communication.

7. The method according to claim 1,
wherein the UE is configured to release a resource related to the ProSe communication when the ProSe communication has been terminated in a state in which the UE does not perform the infrastructure communication.

8. The method according to claim 7,
wherein the resource related to the ProSe communication is at least one of a bearer, an Internet Protocol (IP) connection, a Packet Data Network (PDN) connection, an IP address, and a Traffic Flow Template (TFT).

9. A network entity of a wireless communication system supporting a Proximity Service (ProSe), the network entity comprising:
a radio frequency unit; and
a processor configured to:
determine a connected state of a User Equipment (UE) according to whether the UE performs infrastructure communication and whether the UE performs ProSe communication,
determine whether or not to start a Radio Resource Control (RRC) inactivity timer based on the connected state of the UE,
wherein if at least one of the infrastructure communication and the ProSe communication is performed, the RRC inactivity timer is determined not to start, and
wherein if both of the infrastructure communication and the ProSe communication are not performed, the RRC inactivity timer is determined to start, and
perform an S1 release procedure when the RRC inactivity timer expires, if both of the infrastructure communication and the ProSe communication are not performed.

* * * * *